United States Patent [19]

Pater

[11] Patent Number: 4,560,742

[45] Date of Patent: Dec. 24, 1985

[54] HIGH TEMPERATURE RESISTANT POLYIMIDE FROM TETRA ESTER, DIAMINE, DIESTER AND N-ARYLNADIMIDE

[75] Inventor: Ruth H. Pater, Rocky River, Ohio

[73] Assignee: The United States of America as represented by the Administrator, National Aeronautics and Space Administration, Washington, D.C.

[21] Appl. No.: 434,087

[22] Filed: Oct. 13, 1982

[51] Int. Cl.[4] .............................................. C08G 69/26
[52] U.S. Cl. .................................... 528/342; 528/229; 528/322; 528/345
[58] Field of Search ................ 528/342, 345, 322, 229

[56] References Cited

U.S. PATENT DOCUMENTS 4,338,430  7/1982  Edelman .............................. 528/342
4,455,418  6/1984  Lauver ................................. 528/342

OTHER PUBLICATIONS

Cols. -2, 35-36 of U.S. Pat. No. 3,306,875.

Primary Examiner—Harold D. Anderson
Attorney, Agent, or Firm—James A. Mackin; John R. Manning

[57] ABSTRACT

The invention described relates to improved polyimide resins which are noted for their high thermal and oxidative stability, high strength at elevated temperatures and which exhibit many other outstanding physical and chemical properties, especially useful in high temperature applications.

The polyimides are prepared by the raction, with application of heat of a mixture of monomers comprising (a) a dialkyl or tetraalkyl ester of an aromatic tetracarboxylic acid, (b) and aromatic diamine, (3) a monoalkyl or dialkyl ester of a dicarboxylic acid, and (d) a N-arylnadimide such as N-phenylnadimide.

Polyimides of monomers (a), (b) and (c) are known.

3 Claims, No Drawings

HIGH TEMPERATURE RESISTANT POLYIMIDE FROM TETRA ESTER, DIAMINE, DIESTER AND N-ARYLNADIMIDE

ORIGIN OF THE INVENTION

The invention described herein was made by employees of the United States Government for governmental purposes without the payment of any royalties therefor.

BACKGROUND OF THE INVENTION

1. Field of the Invention

This invention relates to polyimide resins which are noted for their high thermal and oxidative stability, high strength at elevated temperatures, and which exhibit many other outstanding physical and chemical properties especially useful in high temperature applications. Such polyimides have been particularly useful in applications such as jet engine compressor components, for example, blades, vanes, air seals, air splitters, and engine casing parts. They are generally useful in applications where high strength and temperature capabilities are required at temperatures of up to 700° F.

2. Description of the Prior Art

Polyimides having excellent high temperature oxidative and thermal stability and outstanding mechanical properties have been described in U.S. Pat. No. 3,745,149. In addition, these polyimides, often referred to as "PMR polyimides", are characterized by low cost and easy processing.

SUMMARY OF THE INVENTION

The present invention relates to PMR polyimides improved over those described in U.S. Pat. No. 3,745,149. The novel polyimides of the invention exhibit improved flow, superior elevated temperature, thermo-oxidative stability and increased tack and drape characteristics compared to the polyimides of U.S. Pat. No. 3,745,149. At the same time, the polyimides of the invention retain the other advantages of PMR polyimides such as low cost and easy processing.

According to this invention, macro-molecular polyimides are prepared from mixtures of monomers of (a) a dialkyl or tetraalkyl ester of an aromatic tetracarboxylic acid, (b) an aromatic diamine, (c) a monoalkyl or dialkyl ester of a dicarboxylic acid, and (d) N-arylnadimide, wherein the ratio of a:b:c is n:(n+1):2, wherein n is an integer of from 1 to 20 and d is present in an amount of about 0.5 to 10% by weight of the total composition. The monomers are mixed in an organic solvent and comprise 30 to 70% by weight of the solution. The solution of monomers has excellent long-term shelf life. The monomers are nonreactive at room temperature but react at elevated temperatures to form prepolymers, and when cured at high temperatures form macromolecular polyimides having molecular weights of at least 10,000.

The improved flow of the novel polyimide resins of the invention provides easy processing and to give consistently good quality products, when complex contour composites are to be fabricated, when low pressure autoclave processing is to be used, or when the injection molding advantages are to be taken. The life of the superior thermo-oxidative graphite composite of the invention is extended to 1700 hours at 600° F. in air. It is 1200 hours for the system described in U.S. Pat. No. 3,745,149 under those condition. The method of the invention can also improve long-term reliability and durability of the composite used at high temperatures. Furthermore, the increase tack and drape characteristics of the novel polyimides offer easy handling of prepreg materials during lay-up.

DETAILED DESCRIPTION OF THE INVENTION

According to this invention, the high temperature macromolecular polyimides are synthesized from a mixture of monomer compounds of the following formulas:

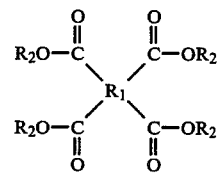

(a)

wherein $R_1$ is a tetravalent aryl radical and $R_2$ is alkyl, preferably lower alkyl of one to four carbon atoms, or hydrogen, at least two of $R_2$ being alkyl;

(b)  $H_2N-R_3-NH_2$ wherein $R_3$ is a divalent aryl radical; and

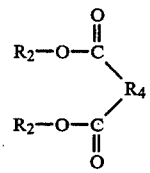

(c)

wherein $R_2$ is defined as in (a) above, and wherein at least one of $R_2$ in (c) is alkyl, and $R_4$ is a divalent radical of the formulas:

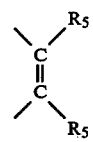

or

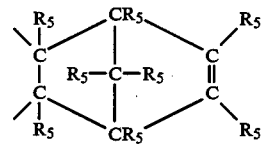

wherein $R_5$ is hydrogen or lower alkyl of one to four carbon atoms, and is preferably methyl; and

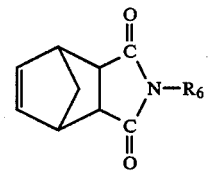

d wherein $R_6$ is a monovalent aryl radical.

The esters of the tetracarboxylic acid defined in (a) above may be readily prepared according to the known methods from the corresponding dianhydrides of the formula:

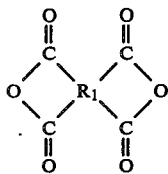

wherein $R_1$ is as defined above. Representative of the many dianhydrides which may be employed include pyromellitic dianhydride, 3,3',4,4'-benzophenonetetracarboxylic-dianhydride, 2,3,6,7-naphthalene tetracarboxylic dianhydride, 2,2',3,3'-diphenyl tetracarboxylic dianhydride, bis(3,4-dicarboxyphenyl)sulfone dianhydride, 1,4,5,8-naphthalene tetracarboxylic dianhydride.

Representative diamines of the type defined in (b) above are benzidine, 4,4'-methylenedianiline, 4,4'-thiodianiline, 4,4'-oxydianiline, 4,4'-diaminodiphenyl sulfone, m-phenylenediamine, p-phenylenediamine.

The mono- or dialkyl esters of the dicarboxylic acid defined in (c) may be prepared readily from the corresponding anhydride of the formula:

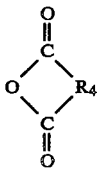

wherein $R_4$ is as defined above. Representative of such anhydrides include maleic anhydride, citraconic anhydride, 5-norbornene-2,3-dicarboxylic anhydride, methyl-5-norbornene-2,3-dicarboxylic anhydride, methyl-5-norbornene-2,3-dicarboxylic anhydride.

Illustrative of N-arylnadimides of the type defined in (d) above are N-phenylnadimide, N-naphthylnadimide N-benzylnadimide and the like.

An organic solvent is employed to dissolve the monomer reactants. The solvent is one which must not react with the monomers during the processing conditions. Representative examples of suitable solvents are N,N-dimethylformamide, N,N-dimethylacetamide, dimethylsulfoxide, N-methylpyrrolidone, aliphatic alcohols, aliphatic alcohol ethers, and alkylbenzenes such as xylene. Mixtures of two or more of such solvents may be employed.

The solutions of the monomer reactants of the present invention are very stable and have an extremely long shelf life. They do not require any special packaging or storage conditions.

The solutions of the monomer reactants of the present invention may be reacted to form modified prepolymers of the types described in U.S. Pat. No. 3,745,149 by heating the solutions at temperatures of 50° C. to 205° C. thereby forming low molecular weight end-capped prepolymers. The molecular weight of the end-capped prepolymers can be adjusted to desired values by varying the value of the number n between 1 and 20 provided molar ration $nR_1$ (n+1) $R_3$:$2R_4$ is maintained, as indicated above, for the relationship of a:b:c. The prepolymers have an average molecular weight in the range of 400 to 10,000. Such end-capped prepolymers, as is known, are stable below 275° C. When heated at from about 275° C. to about 350° C. the end-capped portion of the molecule becomes reactive and chain extension and cross-linking occur to form high molecular weight thermally stable polyimides.

One of the important advantages of the present invention is that there is no need to form the polyimide prepolymer prior to heating at curing temperature to form the high molecular weight polyimides. Thus, the solution of monomer mixtures of the present invention may be applied to substrates and then heated to a cure temperature of 275° C. to 350° C. to obtain the high molecular weight polyimide within 30 minutes to an hour. For instance, the resin solutions may be applied to unidirectional fibers, or chopped short fibers to give composite materials. It can also be applied to adherents for bonding composites, metals and other surfaces. The resin solution may also be used to produce neat resins with a variety of forms and shapes.

The following are examples that illustrate preparation and use of the novel polymers for applications is advanced composites, structural adhesives and as heat resin articles. However, it is to be understood that the examples are merely illustrative, and intended to enable those skilled in the art to practice the invention in all of the embodiments flowing therefrom and do not in any way limit the scope of the invention defined in the claims.

In each of the examples below the N-phenylnadimide (Pn) employed was prepared according to the following procedure: To a stirred and warm (158° F.) solution of 42.0 g (0.26 mole) of NA in 300 ml of acetonitrile was added in one portion a solution of 24 ml (0.26 mole) of aniline in 75 ml of acetonitrile. The mixture was refluxed while stirring for 94 hours. Upon cooling to room temperature, the reaction solution was washed 3 times with 200 ml of saturated potassium carbonate solution. Concentration of the organic solution using a rotary evaporator under reduced pressure afforded 55.4 g (89 percent yield) of endo-N-phenylnadimide as white crystals, m.p. 291°–294° F.

EXAMPLE 1

(a) Into a solution of 11.81 g (0.031 mole) of dimethyl ester of 3,3',4,4'-benzophenonetetracarboxylic acid (BTDE) in 26.65 g of anhydrous methanol are introduced 8.96 g (0.045 mole) of 4,4'-methylenedianiline (MDA), 5.75 g (0.029 mole) of monomethyl ester of 5-norbornene-2,3-dicarboxylic acid (NE), and 0.13 g (0.0005 mole) of N-phenylnadimide (PN). The mixture was stirred at room temperature for one-half hour to give a clear brown solution which contains 50 weight percent solid materials. The resin system is designated PMR-P1.

(b) For advanced composite applications, approximately 36 g of unsized Celion 6000 graphite fibers are wound into a mandrel to form a 3 inch dry tape. The above solution is evenly applied to the dry fiber tape using a brush. Solvent is allowed to evaporate from the tape by rotating the drum at room temperature for 16 hours. The tape is removed from the drum, cut into 3 inch by 8 inch plies, stacked unidirectionally to 12 plies, and then staged at 400° F. for one hour in an air circulating oven. The staged lay-up is placed in a cold matched metal die. This is then inserted into a preheated 600° F. press. A thermocouple is attached to the matched die to follow the temperature. When the die temperature reaches 540° F., 500 psi pressure is applied. The temperature is raised to 600° F. at 7° F./minute. The composite is cured at 600° F. under 500 psi pressure for two hours and removed from the press when the die temperature reaches 350° F. The composite is given a free standing post-cure at 600° F. for 16 hours in an air circulating oven. The resulting composite, designated as Celion 6000/PMR-P1 composite, is essentially void-free (0.6 volume percent) and retains 122 percent 600° F. flexural strength and 91 percent 600° F. interlaminar shear strength after aging at 600° F. in air for 1500 hours (from 112.7 ksi initial flexural strength to 137.2 ksi and from 6.13 ksi initial shear strength to 5.58 ksi).

(c) For neat resin applications, the above solution is first concentrated using a rotary evaporator, staged at 400° F. for one hour in an air circulating oven, and then grounded into fine brown molding powder. Approximately 4 g of the molding powder is used to prepare a black resin disc having one inch diameter and 0.25 inch thickness in accordance with the following procedure. The molding powder is placed in an one inch diameter cold mold attached with a thermocouple. After inserting a plunger, the mold is inserted into a press preheated to 600° F. As soon as the mold temperature reaches 570° F., 500 psi pressure is applied. The temperature is raised to 600° F. at 7° F./minute. The resin is cured at 600° F. under 500 psi pressure for two hours and removed from the press when the temperature cools to 350° F. The cured resin exhibits no apparent voids and has a density of 1.28 g/cc and a glass transition temperature of 630° F.

EXAMPLE 2

(a) As in Example 1(a), a 50 weight percent solution is prepared from stirring 11.81 g (0.031 mole) of BTDE, 8.96 g (0.045 mole) of MDA, 5.75 g (0.029 mole) of NE, and 0.34 g (0.0014 mole) of PN in 26.86 g of anhydrous methanol. The resin system is designated PMR-P2.

(b) A Celion 6000/PMR-P2 composite is fabricated as in Example 1(b), using the above solution, except that the pressurization temperature of the PMR-P2 composite is increased to 550° F. This increase of the pressurization temperature is done to control the resin content of the cured composite desired for approximately 40 volume percent. It is found that there exists a linear correlation between the quantity of PN used in the resin composition and the amount of the resin flow in the composite. By delaying the application of the cure pressure to a higher temperature in the cure cycle, the higher flow composite can easily be controlled to give a similar resin content as that of the PMR-P1 composite. Like the PMR-P1 composite, the PMR-P2 composite system is found to be essentially void-free (0.1 volume percent void) and exhibits excellent elevated temperature (600° F.) performance. The initial 600° F. flexural and interlaminar shear strengths are 118.4 ksi and 5.94 ksi, respectively. After 1500 hours at 600° F. in air, the 600° F. flexural and interlaminar shear strengths not only do not decrease but improve which are 137.0 ksi and 6.19 ksi, respectively.

(c) A near resin disc of PMR-P2 prepared as in Example 1(c) gives a density of 1.26 g/cc and a glass transition temperature of 630° F.

EXAMPLE 3

(a) A solution containing 50 weight percent solid is prepared from 11.81 g (0.031 mole) of BTDE, 8.96 (0.045 mole) of MDA, 5.75 g (0.029 mole) of NE, and 0.48 g (0.002 mole) of PN in 26.99 g of anhydrous methanol. The resin system is designated PMR-P3.

(b) From the above solution, a Celion 6000/PMR-P3 composite is fabricated, using a pressurization temperature at 560° F. The void content of the composite is found to be 0.5 volume percent. The initial 600° F. flexural and interlaminar strengths are 127.5 ksi and 6.78 ksi, respectively. Excellent elevated temperature mechanical property retention is also observed for the PMR-P3 composite. After 1500 hours at 600° F. in air, the composite retains 108 and 91 percentages of the 600° F. flexural and interlaminar shear strengths.

(c) A resin disc of PMR-P3 shows a density of 1.24 g/cc and a glass transition temperature of 628° F.

EXAMPLE 4

(a) A 50 weight percent resin solution is prepared from 11.81 g (0.031 mole) of BTDE, 8.96 g (0.045 mole) of MDA, 5.75 g (0.029 mole) of NE, and 0.62 g (0.0026 mole) of PN in 27.14 g of anhydrous methanol. The resin system is designated PMR-P4.

(b) This solution is used to fabricate a Celion 6000/PMR-P4 composite, using a pressurization temperature of 570° F. The cured composite gives superior initial mechanical properties but shows slightly inferior property retention, compared to the three composite systems discussed previously, after 1500 hours exposure at 600° F. in air. The initial room temperature flexural and interlaminar shear strengths of the PMR-P4 composite are 240.9 and 16.76 ksi, respectively and the initial 600° F. flexural and interlaminar shear strengths are 126.4 and 7.53 ksi, respectively. After exposure for 1500 hours at 600° F. in air, the 600° F. flexural and interlaminar shear strengths decrease to 117.9 (93% retention) and 5.48 (73% retention) ksi, respectively.

(c) A neat resin of PMR-P4 shows a density of 1.22 g/cc and a glass transition temperature of 625° F.

EXAMPLE 5

(a) A 50 weight percent monomer mixture solution is prepared from 11.81 g (0.031 mole) of BTDE, 8.96 g (0.045 mole) of MDA, 5.75 g (0.029 mole) of NE, and 0.70 g (0.003 mole) of PN in 27.22 g of anhydrous methanol. The resin system is designated PMR-P5.

(b) From this solution, a Celion 6000/PMR-P5 composite is fabricated, using a pressurization temperature of 580° F. The initial room temperature flexural and interlaminar shear strengths are 268.7 and 16.09 ksi, respectively, and the initial 600° F. strengths are 129.6 and 6.58 ksi, respectively. After exposure for 1500 hours at 600° F. in air, the 600° F. strengths decrease to 121.7 and 5.55, respectively.

In Table 3 below, the physical properties of PN-modified PMR polyimides prepared as described in the above examples are compared to a PN-unmodified PMR polyimides, identified as PMR-15. PMR-15 comprises 2 moles of monomethyl ester of 5-norborene-2,3-dicarboxylic acid, 3.087 moles of 4,4'-methylenedianiline and 2.087 moles of dimethyl ester of 3,3',4,4'-benzophenone-tetracarboxylic acid.

TABLE 3
PHYSICAL PROPERTIES OF MODIFIED PMR POLYIMIDE/CELION 6000 COMPOSITES

| Resin System | Density g/cc[a] | Glass Transition Temperature, °F.[b] | | | Composition Volume Percent[a] | | |
|---|---|---|---|---|---|---|---|
| | | As Fab.[c] | 1000 Hrs. Aged[d] First | Second | Fiber | Resin | Void |
| PMR-15 (Control) | 1.58 | 666 | 698 | 739 | 59.2 | 40.2 | 0.6 |
| PMR-P1 | 1.56 | 644 | 680 | 707 | 58.1 | 41.3 | 0.6 |
| PMR-P2 | 1.55 | 644 | 680 | 709 | 58.8 | 41.1 | 0.1 |
| PMR-P3 | 1.55 | 644 | 685 | 716 | 57.3 | 42.2 | 0.5 |
| PMR-P4 | 1.55 | 626 | 680 | 707 | 57.9 | 41.6 | 0.5 |
| PMR-5 | 1.55 | 653 | 680 | 711 | 57.1 | 42.5 | 0.4 |

[a] average of three determinations
[b] determined by thermomechanical analysis heating rate of 18° F./minute
[c] as fabricated - post cured for 16 hours at 600° F. in air
[d] aged at 600° F. in air Table 3 shows the physical properties of the PN modified and unmodified composites. By delaying the application of cure pressure to higher temperatures in the cure cycle, essentially void free PN modified PMR composites were produced as determined by ultrasonic C-scan and by the resin digestion technique. The PN modified and unmofidied PMR-15 composites showed only small variations (57 to 59 moles percent) in fiber content. Thus, the fiber contents of the PN modified PMR can be controlled in the same fashion as PMR-15 even though these resins have much higher flow characteristics. The Tg of the modified PMR composites was about 18° F. lower than the Tg of the PMR-15 (control) composite. After isothermal aging for 1000 hours, the Tg's of all composites increased by about 36° F. In addition, each of the aged composites invariably exhibited a second glass transition temperature which was found to be approximately 36° F. higher than its first glass transition temperature. The presence of two distinctive glass transition temperatures suggests that at least two chemically distinctive polyimides may be formed in the course of the long term thermooxidative exposure.

In Table 4 below the mechanical properties of modified PMR polyimide (PMR-P1-P5/Celion 6000 graphite fibers composites as fabricated are uncompared to a PN-unmodified PMR polyimides (PMR-15)/Celion 6000 graphite fiber composite.

TABLE 4
MECHANICAL PROPERTIES OF MODIFIED PMR POLYIMIDE/CELION 6000 COMPOSITES AS FABRICATED

| Composite Property | Resin System | | | | | |
|---|---|---|---|---|---|---|
| | PMR-15 (Control) | PMR-P1 | PMR-P2 | PMR-P3 | PMR-P4 | PMR-P5 |
| Flexural Strength, ksi[a] | | | | | | |
| Room Temperature | 231.1 | 227.1 | 230.9 | 235.5 | 240.9 | 268.7 |
| 600° F. | 133.9 | 112.7 | 118.4 | 127.5 | 126.4 | 129.6 |
| Flexural Modulus, psi × 10⁶[a] | | | | | | |
| Room Temperature | 16.17 | 15.66 | 17.19 | 15.64 | 16.62 | 17.66 |
| 600° F. | 14.58 | 13.12 | 13.21 | 14.26 | 14.65 | 13.61 |
| Interlaminar Shear Strength, ksi | | | | | | |
| Room Temperature[b] | 14.19 | 17.06 | 14.04 | 15.89 | 16.76 | 16.09 |
| 600° F.[c] | 6.46 | 6.13 | 5.94 | 6.78 | 7.53 | 6.58 |
| Tensile Strength, ksi[b] 10° off axis | | | | | | |
| Room Temperature | 63.50 | 64.16 | 59.36 | 62.20 | 64.19 | 64.22 |
| Tensile Modulus, psi × 10⁶[d] | | | | | | |
| Room Temperature[d] | 9.14 | 8.76 | 8.99 | 8.64 | 7.83 | 10.12 |
| Elongation, Percent[d] | 1.07 | 1.18 | 1.21 | 1.45 | 1.53 | 1.17 |

[a] average of three determinations; normalized to 60 volume percent fiber
[b] average of five determinations
[c] average of three determinations
[d] average of four determinations Table 4 summarizes the mechanical properties of the "as fabricated" composites. Although the initial elevated temperature properties of the modified composites were slightly lower than those of the control, the room temperature properties of the modified PMR composites were equal to or superior to the room temperature properties of the control PMR-15 composites. Thus, it may be concluded that quality composites were fabricated from higher flow PN modified PMR prepreg with no sacrifice in the mechanical properties of the composites. The high value of RT flexural strength for the PMR-P5 composite is not readily explainable at this time.

In Table 5 below the mechanical properties of modified PMR polyimide (PMR-P1-P5)/Celion 6000 composites exposed and tested in air at 600° F. are compared to PN-unmodified PMR polyimides (PMR-15) Celion 6000 graphite fiber composite.

TABLE 5
MECHANICAL PROPERTIES OF MODIFIED PMR POLYIMIDE/CELION 6000 COMPOSITES EXPOSED AND TESTED IN AIR AT 600° F.

| 600° F. Composite Properties | Resin Systems | | | | | |
|---|---|---|---|---|---|---|
| | PMR-15 | PMR-P1 | PMR-P2 | PMR-P3 | PMR-P4 | PMR-P5 |
| Flexural Strength, ksi[a] After exposure for | | | | | | |
| 0 Hour | 133.9 | 112.7 | 118.4 | 127.5 | 126.4 | 129.6 |
| 360 Hours | 143.6 | 143.7 | 140.9 | 153.7 | 161.4 | 148.0 |
| 600 Hours | 145.1 | 151.2 | 152.6 | 151.7 | 164.6 | 143.9 |
| 1000 Hours | 146.5 | 153.5 | 150.4 | 154.4 | 163.1 | 154.8 |
| 1500 Hours | 115.6 | 137.2 | 137.0 | 138.2 | 117.9 | 121.7 |

TABLE 5-continued

MECHANICAL PROPERTIES OF MODIFIED PMR POLYIMIDE/
CELION 6000 COMPOSITES EXPOSED AND TESTED IN AIR AT 600° F.

|  | Resin Systems | | | | | |
|---|---|---|---|---|---|---|
| 600° F. Composite Properties | PMR-15 | PMR-P1 | PMR-P2 | PMR-P3 | PMR-P4 | PMR-P5 |
| Flexural Modulus, psi × $10^{6a}$ After exposure for | | | | | | |
| 0 Hour | 14.58 | 13.12 | 13.21 | 14.26 | 14.65 | 13.61 |
| 360 Hours | 15.54 | 15.96 | 14.79 | 15.16 | 15.2 | 14.77 |
| 600 Hours | 15.71 | 14.71 | 14.23 | 15.14 | 15.11 | 14.01 |
| 1000 Hours | 12.32 | 13.00 | 12.33 | 12.32 | 13.48 | 12.64 |
| 1500 Hours | 8.29 | 11.53 | 11.04 | 9.53 | 8.15 | 7.09 |
| Interlaminar Shear Strength, $ksi^b$ After exposure for | | | | | | |
| 0 Hour | 6.46 | 6.13 | 5.94 | 6.78 | 7.53 | 6.58 |
| 360 Hours | 6.83 | 6.67 | 6.59 | 7.02 | 7.90 | 6.91 |
| 600 Hours | 6.72 | 6.64 | 6.76 | 7.10 | 7.81 | 7.24 |
| 1000 Hours | 6.54 | 6.59 | 6.64 | 7.02 | 7.98 | 7.33 |
| 1500 Hours | 4.40 | 5.58 | 6.19 | 6.13 | 5.48 | 5.55 |

[a]average of three determinations; normalized to 60 volume percent fiber
[b]average of three determinations Table 5 summarizes the elevated temperature mechanical properties of the composites exposed and tested at 600° F. in air, using precut flexural and interlaminar shear specimens. Table 5 shows that PN modified and PMR-15 composites exhibited excellent strength properties at 600° F. after 1000 hours aging at 600° F. in air. It is significant that as a result of 360 hours of exposure all of the composites showed a significant improvement in 600° F. flexural and interlaminar shear strengths, but no change in flexural modulus. Furthermore, even after 1000 hours, the composites maintained this improvement. Thus, the PN modified PMR composites exhibited a level of thermooxidative stability at least equivalent to the unmofified PMR-15. This is significant in that a high flow PMR has been developed with no compromise in the thermo-oxidative stability of the polyimide system.

The 1500 hour isothermal aging data gave some rather unexpected results. Namely, PMR composites containing 4 and 9 mole percent PN (i.e., PMR-P1 and -P2, respectively) exhibited superior thermo-oxidative stability than did PMR-15 and the higher mole percent PN containing composites. This is further illustrated by their superior flexural strength, interlaminar shear strength, and flexural modulus retention and their significantly lower weight loss relative to PMR-15 and PMR-P3, -P4 and -P5 composites. Furthermore, the greater thermo-oxidative resistance of the 4 and 9 mole percent PN containing PMR composites is shown in their fiber retention characteristics. The PMR-15 control composite revealed many loose surface fibers after the isothermal exposure at 600° F. in air for 1500 hours. In striking contrast, the PMR-P1 composite contained no loose surface fibers after the same thermo-oxidative exposure as that of the control. Thus, it appears that 4 and 9 mole percent PN in PMR-15 have improved the thermo-oxidative stability of PMR-15, and the useful lifetimes of PMR-15/Celion 6000 composites at 600° F. in air have been extended by approximately 500 hours.

A series of precut flexural specimens of the PN modified and unmodified PMR-15 composites were exposed to 95 percent relative humidity at 180° F. for 360 hours. Table 6 lists the glass transition temperatures and the elevated temperature flexural strengths of the hydrothermally exposed composites.

TABLE 6

HYDROTHERMAL EFFECTS ON PROPERTIES OF
MODIFIED PMR POLYIMIDE/CELION 6000
COMPOSITES EXPOSED FOR 360 HOURS AT
180° F. AND 95 PERCENT RELATIVE HUMIDITY

| Resin System | Moisture Absorbed Wt. Percent[a] | Glass Transition Temp., °F. | | | | 600° F. Flexural Strength, ksi[f] |
|---|---|---|---|---|---|---|
| | | $Dry^b$ | $A^c$ | $B^d$ | $C^e$ | |
| PMR-15 (Control) | 1.3 | 666 | 617 | 658 | 658 | 65.05 |
| PMR-P1 | 1.1 | 644 | 599 | 626 | 613 | 71.46 |
| PMR-P2 | 1.3 | 644 | 599 | 621 | 642 | 62.94 |
| PMR-P3 | 1.3 | 644 | 621 | 640 | 622 | 56.94 |
| PMR-P4 | 1.3 | 626 | 608 | 622 | 622 | 55.05 |
| PMR-P5 | 1.3 | 653 | 617 | 630 | 617 | 54.40 |

[a]average of three determinations
[b]dry as fabricated composites tested at a heating rate of 18° F./minute
[c]tested at a heating rate of 90° F./minute
[d]tested at a heating rate of 18° F./minute
[e]after drying for 15 minutes at 473° F. and then tested at 18° F./minute
[f]temperature spike tested, average of five determinations, and normalized to 60 volume percent fiber The composites exhibited 1.3 percent equilibrium moisture absorption except for PMR-P1 sample, which absorbed 1.1 percent moisture. Moisture caused a considerable decrease in the glass transition temperature, ranging from 18° F. to 54° F. A slower heat-up rate of 18°F./minute compared up 90° F./minute give higher Tg values, indicating that greater drying occurs at the lower heating rate. This is further substantiated by the Tg's of the samples after drying for 15 minutes at 473° F. The Tg's of the dried samples were nearly equal to the Tg's of the composites in the dry as-fabricated condition except for PMR-P1 and -P5. The data demonstrate the reversibility of moisture effect on the Tg of PMR-15. The moisture resistance of PMR-P1 and -P2 was comparable to that of the control PMR-15 (600° F. flexural strengths of about 71.5 and 63 ksi for PMR-P1 and -P2, respectively, compared to about 65 ksi for PMR-15 sample).

These values are approximately 50 percent of the 600° F. dry strengths. The other PN modified PMR composites exhibited lower flexural strengths than the above mentioned composite systems. These results are in agreement with the isothermal aging results which showed that PMR composites containing 4 and 9 mole percent PN demonstrated higher composite properties.

It was expected that lower flexural strengths would be obtained for the wet samples because the flexural strengths were measured at a temperature approaching the Tg of wet specimens using a temperature spike test. This method minimizes the drying of the composites. Conventional testing of wet PMR-15 composites usually includes a 15 minute equilibration period at the test temperature. Previous studies have showed that this allows the composite to dry out and does not provide a realistic assessment of effect of moisture. Therefore, the flexural strengths obtained in this study reflect more closely the actual flexural strengths of the wet samples than the values obtained by the conventional testing method.

What is claimed is:

1. A composition of matter consisting essentially of a mixture of compounds of the formulas:

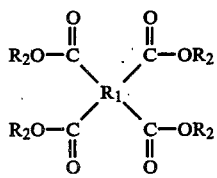 (a)

wherein $R_1$ is a tetravalent aryl radical and $R_2$ is alkyl or hydrogen; and at least two of $R_2$ being alkyl;

(b)

wherein $R_3$ is a divalent aryl radical;

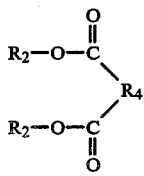 (c)

wherein $R_2$ is as defined in (a) and at least one $R_2$ is aklyl, and $R_4$ is divalent radical of the formula:

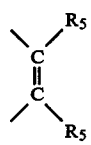

or

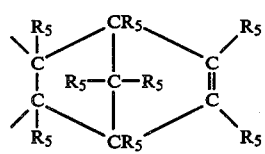

wherein $R_5$ is hydrogen or lower alkyl; and wherein the molar ratio of a:b:c is n:(n+1):2 wherein n has a value from 1 to 20, and (d) an N-arylnadimide present in an amount of about 0.5 to 10% by weight of the total composition said N-arylnadimide being selected from the group consisting of;

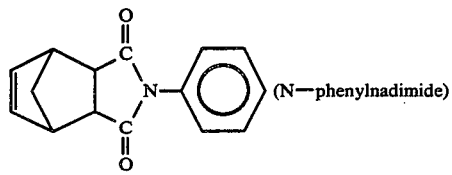 (N—phenylnadimide)

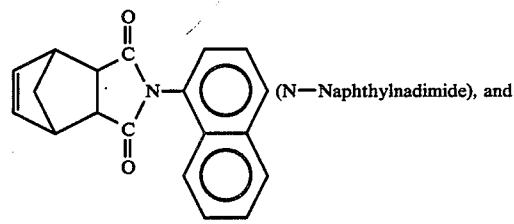 (N—Naphthylnadimide), and

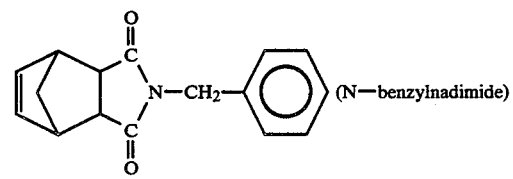 (N—benzylnadimide)

2. A process for preparing a polyimide resin which comprises reacting, by application of heat, a mixture of compounds of the formulas:

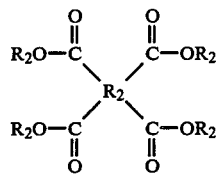 (a)

wherein $R_1$ is a tetravalent aryl radical and $R_2$ is alkyl or hydrogen, and at least two or $R_2$ are alkyl (b)

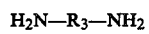

wherein $R_3$ is a divalent aryl radical; and

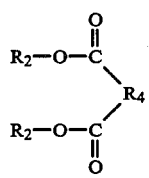 (c)

wherein $R_2$ is as defined in a and at least one $R_2$ is alkyl, and $R_4$ is a divalent radical of the formula:

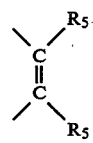

or

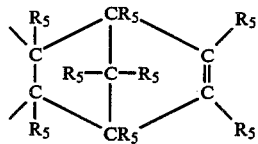

wherein R$_5$ is hydrogen or lower alkyl, and wherein the molar ratio of a:b:c: is n:(n+1):2, wherein n has a value of 1 to 20, and, (d) an N-arylnadimide present in an amount of about 0.5 to 10% by weight of the total composition said N-arylnadimide being selected from the group consisting of;

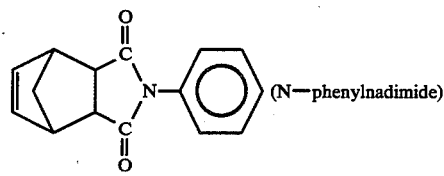

(N—phenylnadimide)

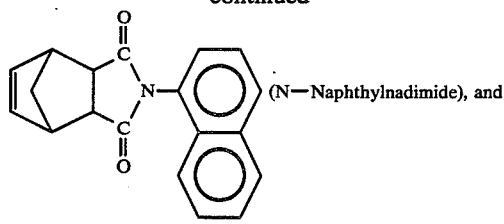

(N—Naphthylnadimide), and

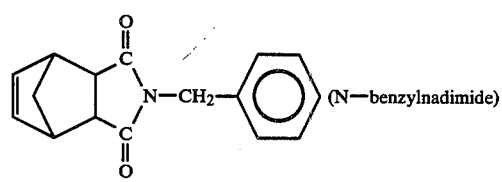

(N—benzylnadimide)

and wherein said application of heat raises the temperature of said reaction mixture to at least 205° C. to obtain polyimide prepolymers.

3. A process as claimed in claim 2 wherein the mixture of comounds is heated to a temperature of about 350° C. to obtain a polyimide polymer.

* * * * *